Sept. 30, 1969          R. M. SCANLON          3,469,675
CONVEYOR SYSTEMS HAVING COMPRESSED SLATS AND SLATS THEREFOR
Filed Nov. 28, 1967

INVENTOR.
ROBERT M. SCANLON
BY Price, Heneveld
Huizenga & Cooper
ATTORNEYS 3,469,675
CONVEYOR SYSTEMS HAVING COMPRESSED
SLATS AND SLATS THEREFOR
Robert M. Scanlon, Grand Rapids, Mich., assignor to
Granco Equipment, Inc., Grand Rapids, Mich., a corporation of Delaware
Filed Nov. 28, 1967, Ser. No. 686,191
Int. Cl. B65g 15/42
U.S. Cl. 198—195                            8 Claims

ABSTRACT OF THE DISCLOSURE

This disclosure relates to a conveyor system for handling hot extruded products such as aluminum in which system a plurality of graphite slats carry hot extruded products from an extrusion die orifice. The graphite slats have inclined side surfaces which are compressed by upwardly slanted slat-supporting flanges. The upwardly slanted sides of the slat-supporting flanges are held together in compressing relationship through a pair of upstanding structural members which are spaced from each other at the top portion thereof and are held in urging relationship towards each other through mechanical fastening means which are spaced downwardly at the top of the upstanding structural members.

---

This invention relates to conveyor systems for handling hot extruded products wherein a plurality of graphite slats are employed in conveying hot extruded products away from an extrusion orifice, wherein the graphite slats have upwardly and inwardly inclined surfaces in lateral cross section, and the slats are compressed from the sides thereof through a pair of upwardly and inwardly inclined slat-supporting flanges.

Extruded products such as aluminum are hot and somewhat soft as they pass out the die orifice. They require that in carrying them away from the extrusion orifice the contacting surfaces be relatively soft and heat resistant in order not to scratch the surface of the extrusion. Graphite slats have been successfully employed for this purpose in a conveyor system in which the slats are connected to a continuous belt. Conventionally, the graphite slats are longitudinally grooved at the sides thereof and are held in place by inserting inwardly directed flanges of the slat holder into the longitudinal grooves. These graphite slats on the conveyor belts are subject to breakage due to impact from extruded products falling onto the conveyor system and due to general rough treatment in the plant. The grooved portions in the side of the graphite slats increases the propensity of the brittle graphite to break since the grooves form notches for the initiation of cracks upon impact.

I have now discovered an improved slat and slat construction for a conveyor system in which the impact strength of the slat is greatly improved and which slat is easily held in place by providing inwardly and upwardly slanted sides on the slat with slat supporting flanges compressing the slanted sides.

By various aspects of this invention one or more of the following or other objects can be obtained.

It is an object of this invention to provide an improved slat construction for a conveyor system for hot extruded products of metal or other similar materials.

It is a further object of this invention to provide an improved conveyor system in which graphite slats have improved strength.

It is a further object of this invention to provide a construction for graphite slats in a conveyor system wherein the propensity of breakage of the graphite slats is minimized.

It is a further object of this invention to provide a conveyor system in which graphite slats are employed wherein the slats are less expensive and easily replaceable.

It is yet another object of this invention to provide an improved graphite slat for use in a conveyor system.

Other aspects, objects, and the several advantages of the invention are apparent to one skilled in the art from a study of this disclosure, the drawings, and the appended claims.

According to the invention, a conveyor system for handling hot extruded products is provided. The conveyor system comprises a plurality of graphite slats which are supported by a continuous belt and the extruded products are carried away from the end of the extrusion orifice by the conveyor system on the graphite slats. Means are provided to move the conveyor belt.

According to the invention the graphite slats have upwardly and inwardly inclined surfaces in lateral cross section. Preferably the graphite slats are of a trapezoidal shape in cross section.

The graphite slat supporting structure has a pair of upwardly and inwardly directed flanges which generally have the same slope as the graphite slats and compress the slats in a lateral direction. Each of the inclined flanges is connected to a pair of upstanding structural members which are urged together through a mechanical fastening means. Preferably, the connecting portion between the upstanding structural member and the upwardly and inwardly inclined flanges is less than one half of the bottom dimension of the graphite slat to thereby form a gap between the top portions of the upstanding structural members. The upstanding structural members abut each other at the bottom portion thereof. Preferably, the mechanical fastening means for the upstanding structural members are spaced downwardly of the top of the upstanding structural members.

The invention will now be described with reference to the accompanying drawings in which.

Figure 1:
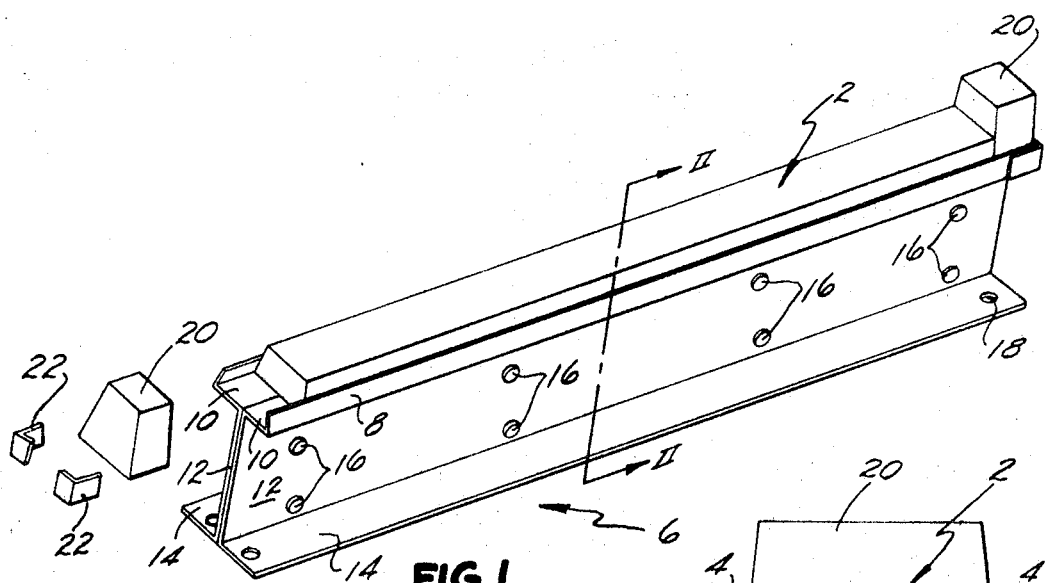
FIG. 1 is a perspective view, partly exploded, showing the construction of a slat according to the invention.
Figure 2:
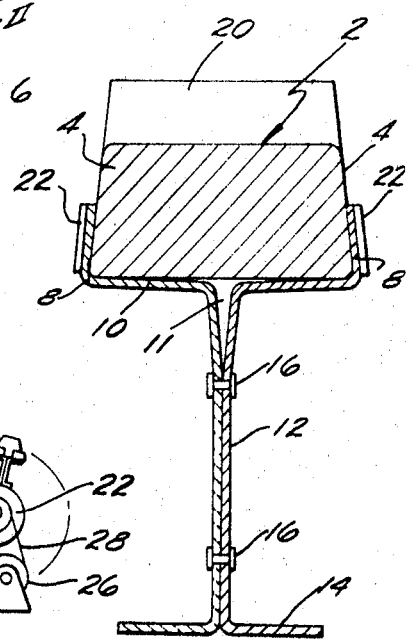
FIG. 2 is a cross sectional view along lines II—II of FIG. 1.

Referring now to the drawings, and to FIGS. 1 and 2 in particular, a longitudinal graphite slat generally designated as 2 has a pair of upwardly and inwardly inclined side walls 4. As can be seen from FIG. 2 the graphite slat is of a trapezoidal shape in cross section.

The graphite slat is held on the conveyor belt by a slat supporting structure generally designated as 6. The slat supporting structure comprises a pair of upwardly and inwardly directed flanges 8 which have a slope approximately that of the sides 4 of the graphite slats. The graphite slat is supported by bottom members 10 which are connected to upstanding structural members 12. The structural members 12 have an outwardly extending flange 14 at the bottom portion thereof through which flange the slat structure is attached to the conveyor belt. For this purpose, holes 18 are provided to bolt the slat structure to plates which are interconnected to form the conveyor belt.

The slats 2 are longitudinally constrained by end blocks 20 which can be made of hard wood or plastic. These blocks 20 are held in place by flanges 18 and by end flanges 22 which can be welded at the ends thereof to flanges 8. The blocks 20 extend above the slats to provide a means of containing the extrusion on the graphite slat. The side slope of the blocks 20 is the same as that of the graphite slats 2.

The upstanding structural members are held together through mechanical fastening means at 16 which can be spot welds or rivets. Preferably rivets are employed.

As can be seen in FIG. 2, each bottom supporting portion 10 is less than one half the width of the bottom of slat 2. Therefore, when the graphite slats are placed within the slat supporting structure 6, a gap 11 results between the upper portion of the two upstanding structural members 12. When the sides are riveted, the bottom portion of the structural member is brought together and the top portion of the structural members 12 have a gap at 11. When the mechanical fastening means 16 draw the sides 12 together, the upwardly and inwardly inclined flanges 18 compress the sides 4 of the graphite slat 2. The mechanical fastening means are preferably spaced a short distance from the top of the upstanding structural members 12 to give the upwardly and inwardly directed flange 18 a small amount of flexibility. The shape of the graphite slat minimizes the propensity of the slats to break from impact. The compression of the sides of the slats still further increases the impact strength of the slats. For example, when a blow is struck on the top portion of the graphite slat 2, the impact breaking point of the slat will be the normal breaking point plus the degree of compression exerted by flanges 18. Thus, the impact strength of the graphite slats is improved through the shape of the graphite slat itself and through the slat-supporting structure wherein the graphite slat is held in compression.

Figure 3:
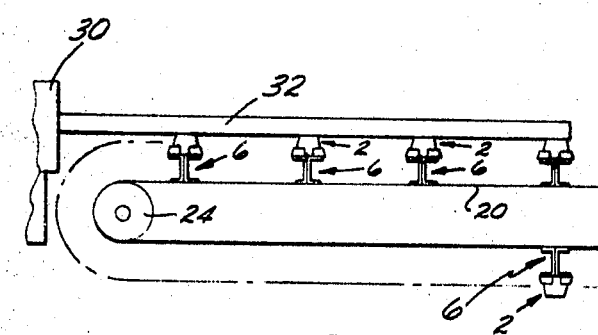
FIG. 3 is a schematic representation of a plurality of slats attached to a conveyor system employed in carrying hot extruded products away from the orifice of extrusion press.

Referring now specifically to FIG. 3, a plurality of graphite slats are supported by a plurality of supporting structures 6 which are attached to a continuous belt 20. The belt rotates about sprocket wheels 22 and 24 and is powered by a motor 6 through a belt drive 28. As can be seen from the drawings, the slats are turned upside down in their return trip. The slats are held in place through the upwardly and inwardly inclined surfaces (in the top position) of flanges 18.

The slats 2 support a metal extrusion 32 and carry the extrusion away from the extrusion orifice of extrusion press 30.

The conveyor system has great applicability in handling extruded products such as hot aluminum, copper, brass or any other such extruded material.

In the event that the graphite slats break and need to be replaced, the same can be easily done by bending back end plates 22, removing block 20 and the broken slat. The new slat is then inserted by wedging apart the slot 11 to spread the flanges 8 and inserting the new slat into the proper position between flanges 8. The wedge is then removed, whereupon the flanges 18 will again be forced against the sides of the new graphite slat. The block 20 can be replaced and the end flanges 22 can be bent back over the end block 20. In the event that the flanges 18 do not exert sufficient force on the slat, the mechanical connecting members 16 can be tightened. This is a simple operation if the mechanical means are rivets. The simple blow on either side of the rivet will serve to tighten the joints.

Whereas the invention has been described with relation to a preferred embodiment, other forms of the invention can be employed without departing from the broader scope of the invention. For example, the graphite slat can have an inwardly sloping side surface and a relatively vertical surface. In this embodiment, the supporting structure can have a vertical flange and an upwardly and inwardly inclined flange adjacent the like shaped surfaces of the graphite slat. The graphite slat can still be held by compressive force of the supporting structure flanges.

Although the graphite slats can be replaceable if desired, the construction of the supporting structure is such that the whole slat construction unit can be replaced quite inexpensively. The slat-supporting structure can be inexpensively made from galvanized sheet metal with a simple stamping and mechanical fastening operation. The unit can be replaced by removing the bolts holding flanges 14, inserting a new unit, and bolting the same to the conveyor.

Conventional means of keeping an extrusion on the slat is a wood or plastic block which has been drilled and bolted or screwed to the slat holder. This drilling causes a localized weakened section where splitting or cracking generally occurs. Minor damage to the system is the usual result. The use of end blocks of the invention provides a stronger end block because there is no drilled hole to weaken the section. Further, the elimination of the drilling appreciably reduces the unit cost of the end block. In the event the end block is forced or knocked from the slat-holder, the block can generally be recovered undamaged and reinserted in the holder.

Reasonable variation and modification are possible within the scope of the foregoing disclosure, the drawings, and the appended claims without departing from the spirit of the invention.

I claim:

1. In a conveyor system for handling hot extruded products wherein a plurality of slats are supported by a continuous belt, means are provided to move a continuous belt, and the extruded products are carried away from the extrusion orifice of the extrusion press by the conveyor system on the slats, the improvement comprises: said slats having upwardly and inwardly inclined surfaces in lateral cross section, said slats being connected to said belt through a slat support means comprising a pair of upstanding structural members in side by side relationship, means at the bottom of said upstanding structural members for attaching said members to a continuous conveyor belt, a slat receiving portion at the top of said upstanding structural members, said slat receiving portion comprising an outwardly extending flange and an upwardly and inwardly extending flange on each of said upstanding structural members, said upwardly and inwardly extending flange having approximately the same slope as the sides of said slat, said slat receiving portion being so shaped as to compress said slat inwardly along the upwardly extending flange to hold said slats tightly in said slat receiving portion.

2. A conveyor system according to claim 1 wherein said outwardly extending flange of said slat receiving portion is shorter in width than one half the width of said slats at the base thereof so that said upstanding structural members are spread from each other at the top portion thereof.

3. A conveyor system according to claim 2 wherein means are provided in the end of said slat receiving portions to restrain the longitudinal movement of said slats.

4. A conveyor according to claim 2 wherein each of said upstanding structural members are urged together at the top portion thereof through mechanical fastening means, said mechanical fastening means being spaced downwardly of the top of the upstanding structural members, said upstanding structural members being urged together at the bottom portion thereof.

5. A conveyor according to claim 1 wherein a restraining block generally conforming to the shape of said flanges is positioned within said upwardly and inwardly extending flanges at the ends of said graphite slats, and end plates are attached to said upwardly and inwardly directed flanges, which end plates are bent behind said restraining blocks.

6. A slat construction comprising a longitudinal, heat resistant and relatively soft slat having at least one upwardly and inwardly inclined, relatively flat side surface; slat supporting means including a pair of upstanding flanges at least one of which being upwardly and inwardly directed adjacent said side surface of said longitudinal slat and said one flange having a slope approximately that of said inclined longitudinal slat side surface, means forcing said upstanding flanges into compressive relationship against said longitudinal slats to improve the impact resistance of said slats and to tightly retain said slats within said slat supporting means; and a restraining block having the same cross-sectional configuration as said slat positioned at either end of said slat, said restraining block extending above the top surface of said slat to retain extruded products on said slat.

7. A slat construction comprising a longitudinal slat having at least one upwardly and inwardly inclined, relatively flat side surface; slat supporting means including a pair of upstanding structural members in side-by-side relationship, a slat receiving portion formed at the top of said upstanding structural members, each of said slat receiving portions having an outwardly extending flange and an upwardly extending flange conforming to the side shape of said longitudinal slat on each of said upstanding structural members, the total length of said outwardly extending flanges of said slat receiving portions being shorter than the width of said slats at the base thereof so that said upstanding structural members are spread from each other at the top portion thereof and means forcing said structural members toward each other at the top portion thereof to compress said slats to improve the impact resistance of said slats and to tightly retain said slats within said slat supporting means.

8. A slat construction according to claim 7 wherein said longitudinal slat is formed of graphite and has two upwardly and inwardly inclined relatively flat side surfaces, and each of said upstanding flanges is directed upwardly and inwardly and has a slope approximately that of said inclined graphite slat side surfaces.

References Cited
UNITED STATES PATENTS

| | | | |
|---|---|---|---|
| 2,071,325 | 2/1937 | Bateman | 198—195 |
| 263,699 | 9/1882 | Heebner | 198—195 |
| 1,129,444 | 2/1915 | Blaul et al. | 198—195 X |
| 1,206,118 | 11/1916 | Larraburu | 198—195 X |
| 1,831,629 | 11/1931 | Mambourg | 198—195 X |

RICHARD E. AEGERTER, Primary Examiner